Jan. 2, 1968  D. D. FAIREY ETAL  3,361,261

FILTER FOR LIQUIDS

Filed Sept. 30, 1965  2 Sheets-Sheet 2

INVENTORS
DOUGLAS DEAN FAIREY
JEFFERSON JACKSON

BY McGlew and Toren
ATTORNEYS

United States Patent Office 3,361,261
Patented Jan. 2, 1968

3,361,261
FILTER FOR LIQUIDS
Douglas Dean Fairey, 419 Kiora Lane, Double Bay, New South Wales, Australia, and Jefferson Jackson, 121 Day St., Sydney, New South Wales, Australia
Filed Sept. 30, 1965, Ser. No. 491,531
Claims priority, application Australia, May 11, 1965, 58,710/65
9 Claims. (Cl. 210—314)

ABSTRACT OF THE DISCLOSURE

A relatively small and compact filter including a two-part body defining a substantially cylindrical cavity, one body part having a centrally located liquid outlet and the other body part having a liquid inlet. Within the cylindrical cavity, there is disposed a filter paper support member in the form of a substantially circular imperforate disk having a filter paper support surface formed with a plurality of intersecting grooves, including concentric circular grooves and radial grooves. The grooves define passages for flow of liquid, passing through the filter paper, radially outwardly to the periphery of the disk, and the periphery or circumference of the disk is formed with passage means for flow of liquid to the opposite surface of the disk and inwardly along radially directed grooves in the opposite surface to the liquid outlet. A filter paper, engaged with the filter paper support surface, is supported against the pressure of incoming liquid except at the areas of the grooves.

---

The present invention relates to a filter for liquids and more particularly to a relatively small and compact form of filter intended for the filtration of relatively small quantities of liquid.

While a filter according to the invention may be put to many uses, one contemplated use is in the filtration of water to be supplied to the container of an office water cooler.

The invention consists in a filter for liquids having a body formed from two main parts detachably secured together around their peripheries one part having on it a liquid inlet connection and the other a liquid outlet connection, a substantially cylindrical cavity being defined between the two bodies within which is a filter paper support member adapted to support a filter paper while permitting liquid to pass through it, there being in or around the said cavity a rubber or like O-ring, the O-ring acting to form a liquid-tight seal seal between the said parts and to clamp a filter paper inserted in the body in position around its circumference.

In order that the invention may be better understood and put into practice a preferred form thereof is hereinafter described, by way of example, with reference to the accompanying drawings, in which.

Figure 2:
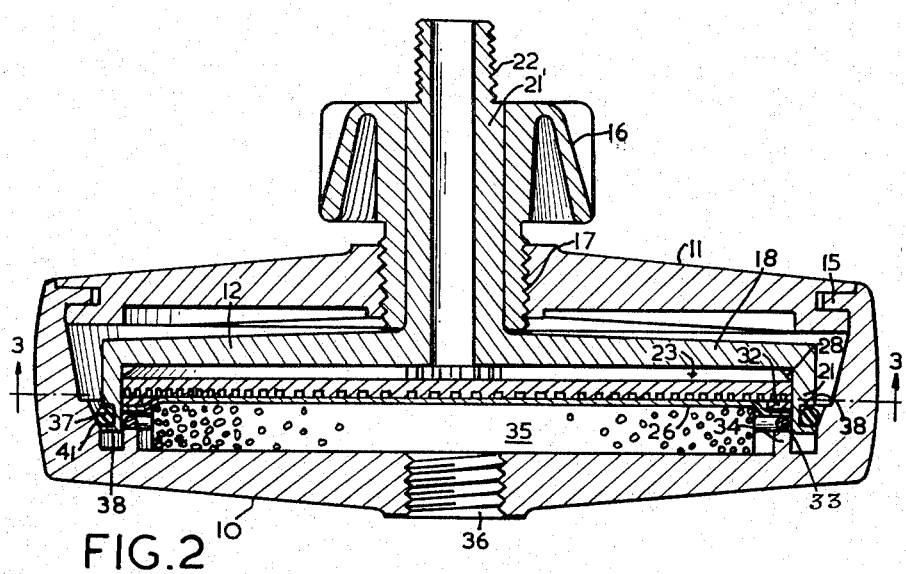
FIG. 2 is a sectional side elevation of the assembled filter.

In the preferred form of the invention the body of the filter is in the form of a squat cylinder and is made in two main parts, a shell or casing 10 and a lid 11 with which is included the filter element carrier 12. These are preferably made in metal by die-casting and are secured together around their peripheries by the insertion of the projections 13 arranged around the lid into the space 14 between corresponding interval projections 15 in the casing 10 and turning the lid relative to the casing so that the projections 13 underlie the projections 15; the handle 16 is then screwed into the thread 17 in the lid 11 to bear onto the filter element carrier 12 in the manner described below. When assembled, the relationship between the parts is as shown in FIG. 2.

The filter element carrier 12 consists of a plate 18 having an annular wall 21 and a hollow stem 21 projecting from the centre of the plate 18 and passing through the lid 11 and the handle 16. The end of the stem 21' is threaded at 22 and constitutes a liquid outlet connection for the lid 11.

Figure 3:
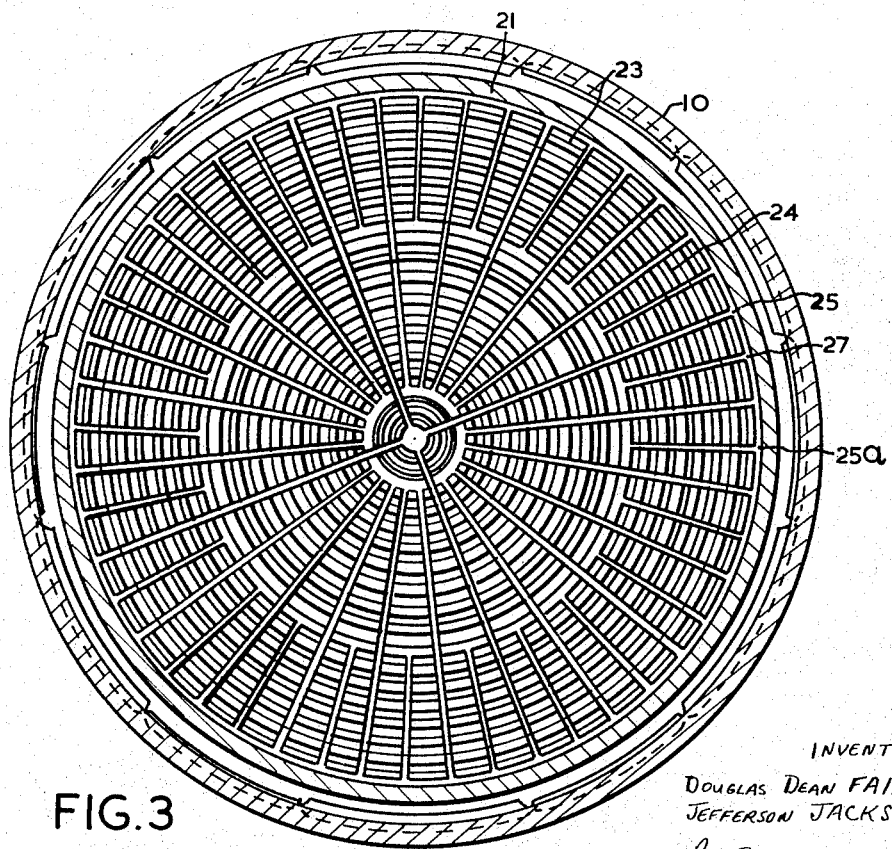
FIG. 3 is a sectional view on line 3—3 of FIG. 2.

Within the cavity of the filter element carrier there is provided a filter paper support member 23 which is in the form of a disc of plastic material the diameter of which is such that it fits closely within the cavity in the filter element carrier 12. It may be a push fit, or a small clearance, for example of 1/1000 of an inch, may be left around its circumference. This member is preferably made by moulding from plastic material and is formed on its lower surface with a series of concentric grooves 24 which are intersected by a plurality of radial grooves 25 and 25a (FIG. 3). The purpose of this arrangement is to support a filter paper 26 on the surface of the member 23 while allowing liquid to pass through it. It will be appreciated in this connection that the filter paper is subjected to a fairly substantial pressure and if it were supported by a member having holes in it, either the holes would have to be very small in which case it would be expensive to manufacture, or there would be the danger of the paper being punctured by the pressure of liquid. Liquid passing through the filter paper is distributed by the annular grooves and passes from them into the radial grooves whence it passes outwardly towards the edge of the member 23. The radial grooves 25 and 25a are preferably made so that they are somewhat deeper towards the circumference of the member and slope upwardly towards the centre to accommodate the increased volume of liquid present near the circumference. The radial grooves are arranged in a form such that whereas the grooves 25 extend from the circumference to the centre of the member, grooves 25a are sloped upwardly more steeply so that they reach the upper surface of the member some distance from the centre. Each groove 25a is arranged to lie midway between a pair of grooves 25. Where each groove meets the circumference a slot 27 is formed through the full thickness of the filter paper support member to enable liquid arriving at the circumference to pass straight through the member into a space formed between the filter body and a chamfer 28 formed around the periphery of the filter support member 23 on the outlet side.

Figure 1:
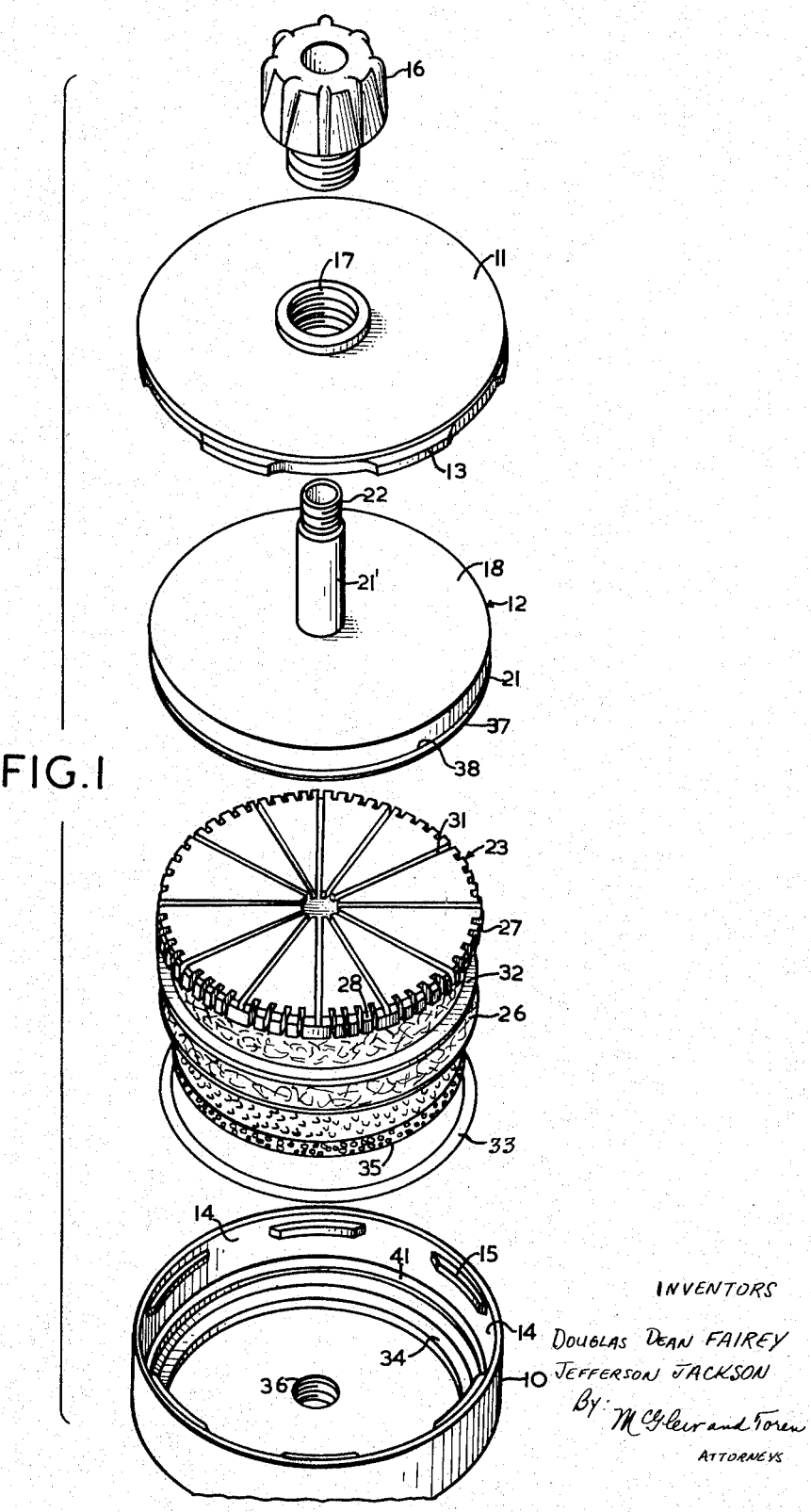
FIG. 1 is a perspective view showing the various parts of the filter separated.

The outlet side of the filter support member seen in FIG. 1 is provided with a series of radial grooves 31 which serve to allow fluid to travel inwardly from the circumference towards the hollow stem 21.

A rubber or like ring 32 lies against the lower surface of the member 23 (as seen in FIG. 1) and fits closely within the annular wall 21. The filter paper 26 rests against the face of the member 23 with its periphery overlapping the ring 32. When the filter is assembled, the periphery of the filter paper 26 is clamped between an O-ring 33 and the ring 32, the O-ring 33 being pressed against the filter paper 26 by the annular ridge 34 in the casing 10.

A plastic foam disc 35 fills the space between the interior of the casing 10 and including the liquid inlet 36 the filter paper 26 and serves to press the filter paper against the filter paper support member 23 as well as acting as a coarse filter.

While the O-ring 33 does form a seal between the casing 10 and the filter element carrier 12 to prevent the escape of liquid, its main function is to press the periphery of the filter paper against its support and a further O-ring 37 is provided in an annular groove 38 around the filter element carrier 12 and when the handle 16 is screwed into the thread 17 O-ring 37 is pressed against the chamfer 41 formed in the interior of the casing 10 to provide a further liquid-tight seal additional to that provided by the O-ring 33 and whereas it is probable that a satisfactory construction could be made using only one or the other seal, it is preferred to use both.

The screwing up of the handle 16 serves also to press the projections 13 of the lid against the undersides of the projections 15 thus clamping the lid securely to the casing. A stop pin prevents the lid from being turned more than necessary to engage the projections 13 and 15 when the parts are being assembled.

In use the liquid inlet 36 is screwed directly or through a suitable elbow or other connector to a water tap, for example, serving a basin or washing machine, the whole filter being supported by the connection between the filter casing and the tap. A hose or spout is connected to the thread 22 so that water from the tap is supplied directly through the filter to the point of use.

The filter, apart from being very simple to mount, is also very convenient in use by virtue of the fact that the parts may be readily separated by undoing the handle 16 and partially rotating the lid to bring the projections 13 into the spaces 14. This can be done without the use of any tools and enables the filter paper 26 to be replaced very easily whenever necessary.

The embodiment of the invention described above is given by way of example only and as will be readily appreciated by those skilled in the art, a variety of modifications within the general scope of the invention may be readily devised.

What we claim is:

1. A filter for liquids comprising, in combination, a body having two main body parts detachably secured together around their peripheries and defining a substantially cylindrical cavity therebetween; a liquid inlet connection on one body part and a liquid outlet connection substantially centrally on the other body part; a filter paper support member positioned in said substantially cylindrical cavity and in the form of a substantially circular imperforate disk having a filter paper support surface facing said liquid inlet connection; said filter paper support surface being formed with a pattern of grooves to support a filter paper by said filter paper support surface except at the locations of said grooves, said grooves defining means for the flow of liquid, which has passed through the filter paper, radially outwardly to the circumference of said disk; the circumference of said disk being formed with passage means for a flow of liquid to the opposite surface of said disk, and said opposite surface so constructed and arranged that liquid flow is then directed radially inwardly along said opposite surface to said liquid outlet connection; and an O-ring positioned in said cavity and engaged between said one body part and the periphery of the filter paper engaging said filter paper support surface of said disk, said O-ring forming a liquid tight seal confining liquid entering through said inlet connection to flow through said filter paper and over and around the circumference of said disk to said outlet connection.

2. A filter as claimed in claim 1, wherein the filter paper support member is in the form of a disc of plastic material the diameter of which is such that it fits closely within said cylindrical cavity.

3. A filter as claimed in claim 1, wherein the filter paper support member is formed on its filter paper support surface with a pattern of concentric circular grooves intersecting radial grooves.

4. A filter as claimed in claim 3, wherein said opposite surface of the filter paper support member is formed with radial grooves which are connected with the first mentioned grooves by slots passing through the member and constituting said passage means on its circumference.

5. A filter as claimed in claim 3 wherein said radial grooves increase in depth from the centre of the member outwardly.

6. A filter for liquids comprising, in combination, a body including a cylindrical shell and a circular lid; said cylindrical shell being closed at one end except for a liquid inlet opening; said shell and lid being formed with selectively engageable and disengageable cooperable means securing the periphery of said lid to the open end of said shell; a filter element carrier within said shell and in the form of a circular plate having a peripheral wall defining a substantially cylindrical space facing said inlet opening; a circular filter paper support member positioned within said cylindrical space and having a circular filter paper support surface facing said liquid inlet opening; said filter paper support member being in the form of an imperforate disk having, on its filter support surface, a pattern of grooves so that a filter paper is supported against the pressure of incoming liquid by said filter paper support surface except at the locations of said grooves; said grooves providing means for flow of liquid, which has passed through the filter paper, radially outwardly to the circumference of said disk; the circumference of said disk being formed with passage means for flow of liquid therethrough to the opposite surface of said disk and said opposite surface so constructed and arranged to direct flow to a liquid outlet connection on said circular plate and extending through an aperture in said lid; means in the closed end of said shell operable to press the periphery of the filter paper against the filter paper support surface of said filter paper support member; a compressible O-ring on said last-named means and engaged with the periphery of the filter paper on said filter paper support surface to press said periphery against said support surface; said O-ring confining liquid entering through said liquid inlet to flow through the filter paper and over and around said disk to said liquid outlet connection; and means on said lid engageable with said filter element carrier to clamp the same against said shell.

7. A filter as claimed in claim 6 wherein the last-mentioned means comprises an external handle threaded into said aperture in said lid, the handle having a central bore through which the liquid outlet connection from said plate passes, the inner end of the handle bearing on said plate; whereby when said handle is screwed into the lid the filter element carrier is pressed against said shell.

8. A filter as claimed in claim 6 including a compressible O-ring carried in a groove around the wall of the filter element carrier and cooperating with a circular chamfer on the interior of the shell.

9. A filter as claimed in claim 6 wherein there is provided, between the filter paper and the closed end of the shell, a disc of plastic foam material to assist in supporting the filter paper and to act as a coarse filter.

References Cited

UNITED STATES PATENTS

| | | | |
|---|---|---|---|
| 2,073,991 | 3/1937 | Koser | 210—489 X |
| 2,583,423 | 1/1952 | Hallinan | 210—488 X |
| 2,646,678 | 7/1953 | Standing et al. | 210—489 X |
| 2,665,009 | 1/1954 | Harstick | 210—445 X |
| 3,031,082 | 4/1962 | Smith | 210—445 X |
| 3,085,689 | 4/1963 | Hering et al. | 210—445 X |

SAMIH N. ZAHARNA, *Primary Examiner.*

REUBEN FRIEDMAN, *Examiner.*

W. S. BRADBURY, *Assistant Examiner.*